July 15, 1958 G. W. KING ET AL 2,843,841
INFORMATION STORAGE SYSTEM
Filed Sept. 20, 1954 6 Sheets-Sheet 1
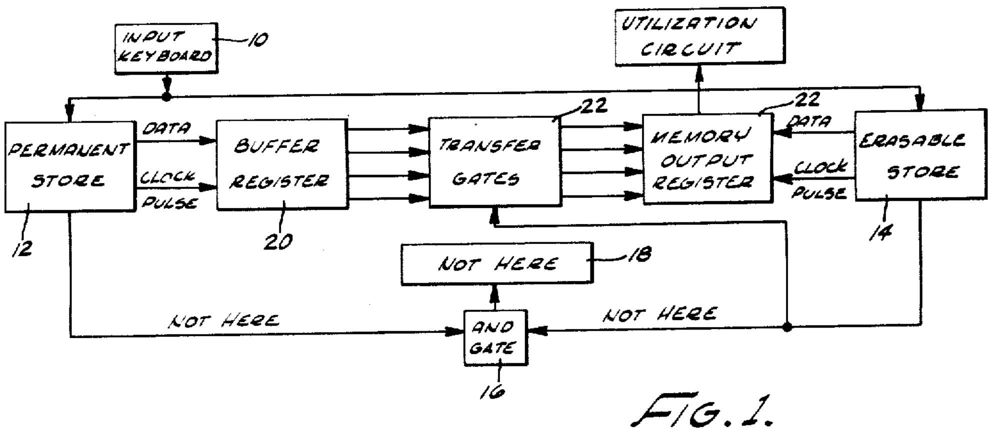
FIG. 1.
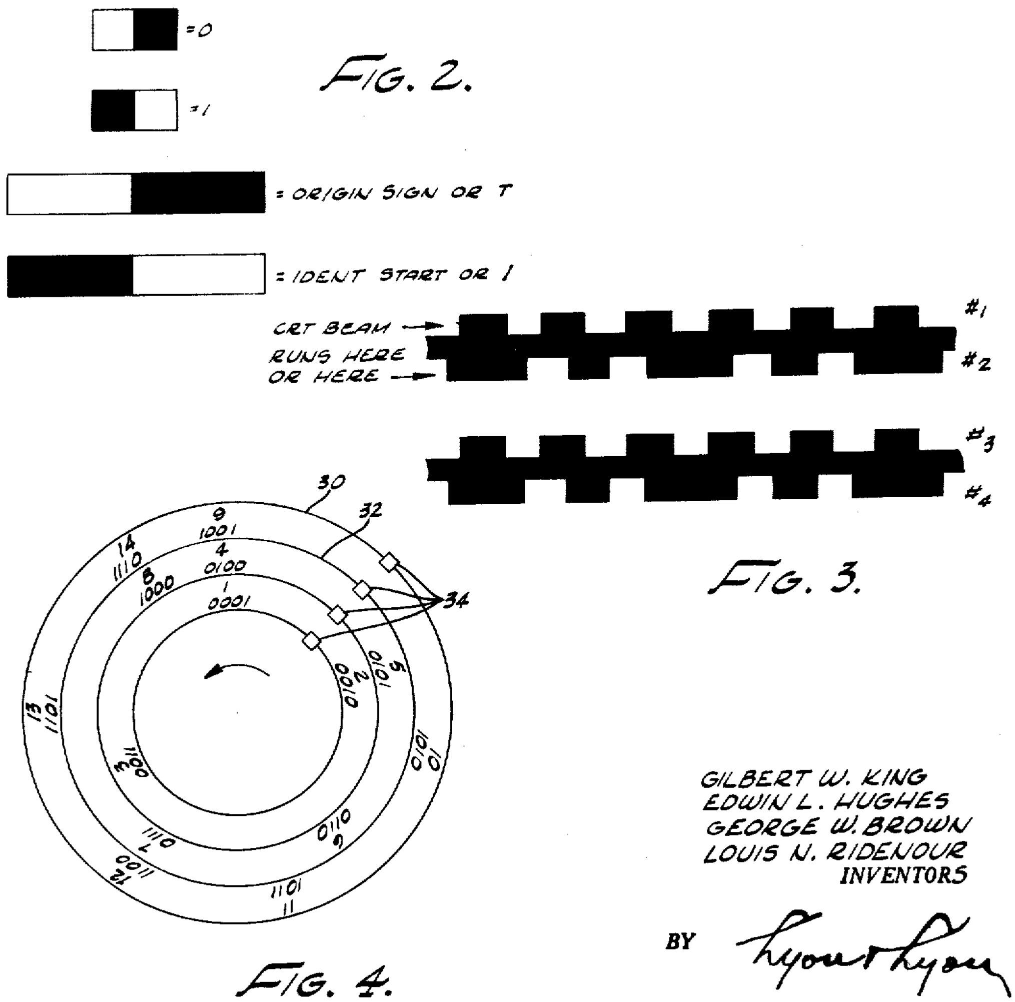
FIG. 2, FIG. 3
FIG. 4.
GILBERT W. KING
EDWIN L. HUGHES
GEORGE W. BROWN
LOUIS N. RIDENOUR
INVENTORS
BY Lyon & Lyon
ATTORNEYS

INFORMATION STORAGE SYSTEM

Filed Sept. 20, 1954 6 Sheets-Sheet 2

GILBERT W. KING
EDWIN L. HUGHES
GEORGE W. BROWN
LOUIS N. RIDENOUR
INVENTORS

BY Lyon & Lyon
ATTORNEYS

GILBERT W. KING
EDWIN L. HUGHES
GEORGE W. BROWN
LOUIS N. RIDENOUR
INVENTORS

BY Lyon & Lyon

ATTORNEYS

GILBERT W. KING
EDWIN L. HUGHES
GEORGE W. BROWN
LOUIS N. RIDENOUR
INVENTORS

BY Lyon & Lyon

ATTORNEYS

July 15, 1958 G. W. KING ET AL 2,843,841

INFORMATION STORAGE SYSTEM

Filed Sept. 20, 1954 6 Sheets-Sheet 5

GILBERT W. KING
EDWIN L. HUGHES
GEORGE W. BROWN
LOUIS N. RIDENOUR
INVENTORS

BY Lyon & Lyon

ATTORNEYS

GILBERT W. KING
EDWIN L. HUGHES
GEORGE W. BROWN
LOUIS N. RIDENOUR
INVENTORS

BY Lyon & Lyon
ATTORNEYS

United States Patent Office 2,843,841

Patented July 15, 1958

2,843,841

INFORMATION STORAGE SYSTEM

Gilbert W. King, Pacific Palisades, Edwin L. Hughes, Los Angeles, George W. Brown, Pacific Palisades, and Louis N. Ridenour, Los Angeles, Calif., assignors to International Telemeter Corporation, Los Angeles, Calif., a corporation of Delaware Application September 20, 1954, Serial No. 457,239

15 Claims. (Cl. 340—173)

This invention relates to an improved information storage system of a type suitable for utilization in information processing machines.

Present-day high speed information handling systems usually have two types of memories. One is a high speed and low capacity temporary store which enables rapid access and rapid write in of new information. The other type of memory is usually a high capacity permanent store which does not permit such rapid access or write in of new information. There is no cooperation between the two types of memories in a direct sense. The temporary or erasable store is usually used to hold instructions or data on which operations are being performed or until the data is called out for utilization with other data. As the name implies, the data in the erasable store is held temporarily. The permanent store contains data such as names and addresses or function tables or other data which is used fairly repetitively and which requires changes rather infrequently. As previously stated, the information held by these two types of memories is not the same. Information is obtained from either but the cooperation of both to provide any single piece of correct information does not exist.

An object of the present invention is to provide a novel system wherein an erasable store and a permanent store are employed cooperatively and in combination.

A further object of the present invention is to provide a system wherein an erasable store and a permanent store cooperate to provide information. Desirable qualities for a permanent store are that it have high storage capacity and low cost. Photographic storage media exceed all others in possessing these qualities. However, in many information handling applications the information stored in the permanent store requires periodic revisions such as changes in addresses of customers or, in inventory control machines, changes in the stock being carried or the quantities thereof, and the like. This would indicate that the permanent store be one in which new or altered information can be entered periodically. This would appear to eliminate the utilization of photographic storage media and require a permanent store such as magnetic tape which lends itself to such revisions.

Another object of this invention is to provide a memory system wherein photographic media may be used as a permanent store despite the requirement for periodic revisions of data held in that store.

A further object of the present invention is the provision of a novel high speed search system in an information storage system.

Still a further object of the present invention is the provision of a novel and useful high speed information storage system.

These and further objects of the present invention are achieved in a memory system employing the combination of a permanent store such as a photographic disc or drum and an erasable store such as a magnetic drum or magnetic core memory. Permanent or quasi permanent information is stored in the permanent store and information which may be deemed temporary, which is related to the permanent information either by way of supplementing it, altering it, correcting it or replacing it, is stored in the erasable store. A search for a desired item of information is made through both stores simultaneously and apparatus is provided for modifying the item output of the permanent store with that from the erasable store in a desired manner. As an illustration, in an inventory machine, descriptions of items are carried on the permanent store and the quantities in stock are carried on the erasable store.

The items of information may be stored on a photographic disc, for example, in concentric rings, or on a photographic drum with adjacent tracks. Each item is identified numerically, each track having the items stored in an increasing numerical identification sequence, each succeeding track having smaller stored items than the preceding tracks. An origin mark is placed in each track between the highest and lowest items stored on that track. Means are provided to read one track at a time. The item identification is compared with the desired identification. If the desired identification is higher than the read identification, then the reading is shifted to the next higher track. If the read identification is higher than the desired identification, then the reading is continued on that track until there is either equality in identification number whereupon the item is read out, or an origin sign is read whereupon the reading is transferred to a preceding lower track. This lower track is then read and if the second origin sign is read before an equality is reached, then the reading is stopped and a "not here" signal is generated. Information may be stored in the adjacent tracks on the drum in the same manner. This technique permits the complete search of a cyclic store in less than two cycles.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a schematic diagram of an embodiment of the invention;

Figure 2 shows the appearance of the code system used with a photographic store;

Figure 3 shows the appearance of four tracks on a photographic disc store;

Figure 4 is a diagram of a disc with numbers stored thereon, which is shown to assist in an explanation of this invention;

THE "TELEPHONE BOOK"

Figure 5:
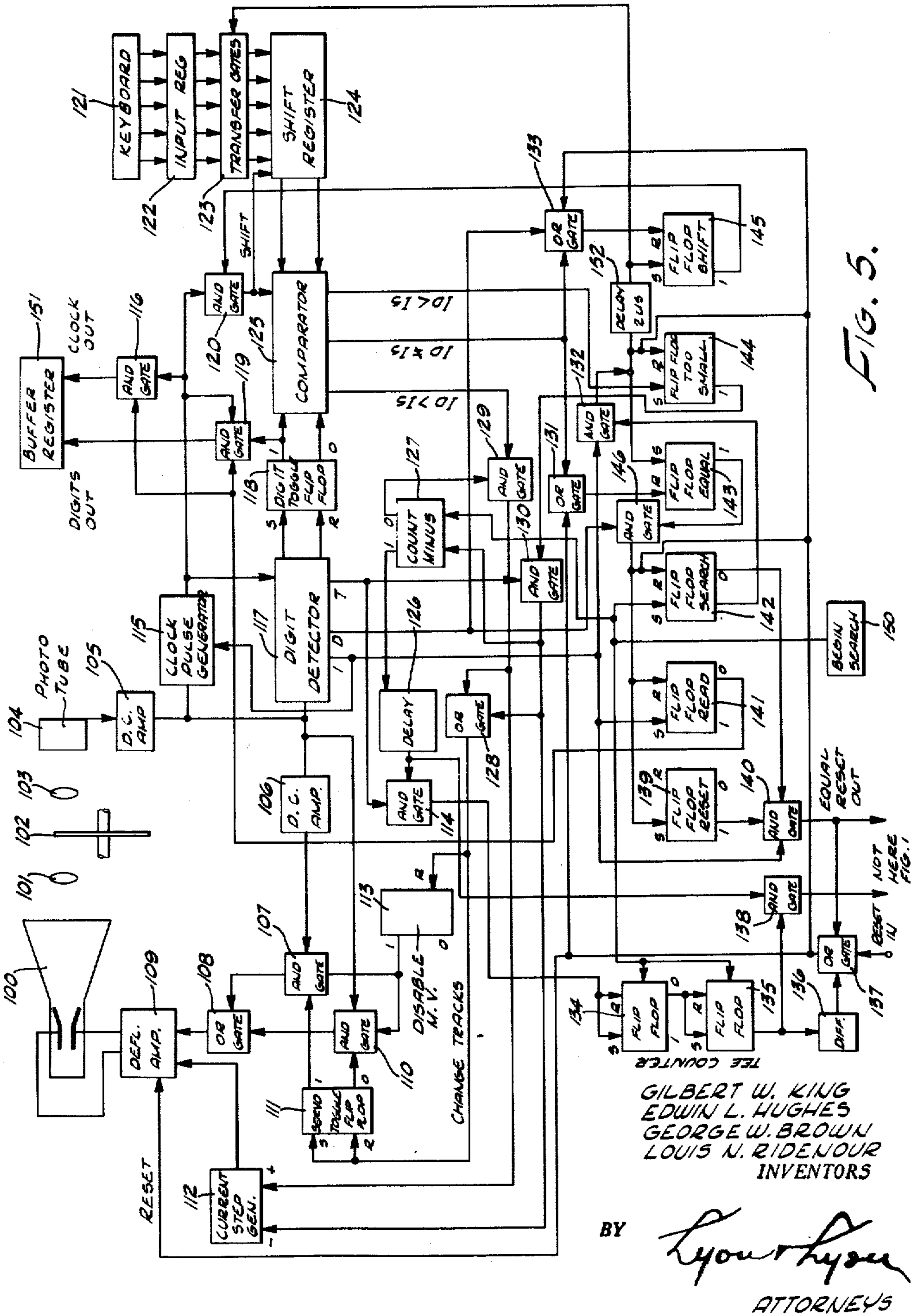
Figure 5 is a schematic diagram of the search and control circuitry required to operate the photographic store used in the present invention.

For purposes of explanation, let it be assumed that a "telephone book" type of storage is desired wherein a name, address, and telephone number are stored in some binary form of an alpha-numeric code. Identification of an item is made using the alpha-numeric code for the name and the address. A complete "telephone book" is stored in a permanent store such as the photographic disc. Output consists of the correct telephone number. A new permanent store is made once a month or other suitable period. At this time, errors in the old store are corrected and changes and additions are incorporated. The erasable store is changed whenever desired to include changes or additions or corrections for the permanent store.

A search is made for an entry in the "telephone book" machine in the following way:

(1) The operator types the identification into a keyboard.

(2) When she is finished, she pushes a button to begin the search.

(3) The permanent and magnetic stores are searched simultaneously. This method gives the shortest access time, although it is not an indispensable feature of the device.

(4) If the identification is found in the permanent store, the data is read to an output register, which holds the information pending notice from the temporary store that the identification is not there. When the "not here" notice comes from the temporary store, the data from the permanent store is transferred to the output circuits of the machine. This method of searching assures that the temporary store will always be examined for errors or changes in the permanent store, before data in the permanent store is delivered to the output.

(5) If the identification is found in the temporary store, the data from the temporary store is transferred to the output and the data from the permanent store is not used.

(6) If the identification is found in neither store, both generate "not here" signals and an appropriate "not here" indication is transferred to the output.

Figure 1 is a schematic drawing of one embodiment of the invention. An input keyboard 10 such as the commercially available "Flexowriter" is used to identify in code the name concerning which information is desired. This code number is sent to both the permanent store 12 and the erasable store 14. Both stores are searched either simultaneously or in sequence. If the information is in neither store, then "not here" outputs are combined in an AND gate 16 to actuate a device 18 indicative of the fact.

If the desired information is found in the permanent store first, then it is entered into a buffer register 20. The permanent store provides clock pulses which are used to time the input of the data to the buffer register. If no supplemental or modifying information is found in the erasable store, then the "not here" pulse output from the erasable store opens the transfer gates 22 to permit the transfer of the desired information to the memory-out register 24 where it can be held and used as desired.

If modifying information is found in the erasable store, it is transferred directly into the memory-out register timed by the clock pulses generated by the erasable store. If the modifying information is to replace that from the permanent store, then the transfer gates 22 are not opened and only the data in the memory-out register from the erasable store is used. If the erasable store data is to supplement that from the permanent store, then it can have recorded an accompanying signal which has the same effect as the "not here" signal, namely, to open the transfer gates 22 so that the permanent store data may be entered after the erasable store data has been entered.

If the desired information is found only in the erasable store and not in the permanent store, then the data is transferred directly into the memory-out register. When the information desired has been found or not found and both stores have been searched, a reset signal is generated to reset all the circuits requiring resetting. The buffer and memory-out registers may be magnetic core or tube registers as is desired. Suitable registers are shown and described on pages 297–301 of the book High-Speed Computing Devices by Engineering Research Associates, Inc. Suitable gates are found described in chapter 4 of that book.

As previously stated, the permanent store may consist of a photographic storage device such as a disc or drum on which information is photographically printed in tracks. A binary "zero" is represented by a transparent square followed by an opaque square. A binary "one" is the reverse. An origin or "T" sign is a long "zero," approximately three times as large. An identification start or "I" sign is a long "one," approximately three times as large. Four data tracks on the disc are shown in Figure 3. The tracks are in pairs, back to back. Two tracks of a pair are separated from each other by an opaque strip. Each pair of tracks is separated from the other by a translucent strip. This is used in a system wherein the light is transmitted through a disc or drum which carries the photographic markings. Of course, where a reflecting disc or drum is used, that is, one carrying the photographic markings that has a reflecting surface, two tracks of a pair are separated by a nonreflecting strip, and each pair of tracks is separated from the other by a reflecting strip. A disc is used herein, by way of example, having concentric rings of information. As can be seen in Figure 5, the disc is rotated for a search and the information on the disc is read by passing a beam of light through it to the cathode of a photomultiplier tube. The beam of light is formed by focusing the light from the spot of a cathode-ray tube on the surface of the disc. As the disc is rotated, the photomultiplier tube converts the varying light intensity into an electrical signal. This electrical signal is processed by the search control section of the machine which recognizes the identification being searched for and reads out the desired information. The control section also furnishes signals to the deflection plates of the cathode-ray tube to position the spot so that the light beam passes through the proper track on the disc.

Each entry on the disc consists of an identification number and a data number. The entries are arranged on the disc according to the numerical order of their identification numbers. The largest numbers are placed on the longest or outermost track, the next largest on the next, and so on. On each track, the numbers are arranged so that if the beam starts at the origin it will pass through the smallest number in that track first, then the next larger, and so on. This type of store is represented in Figure 4 employing binary numbers. Each track 32 on the disc 30 has an origin mark 34. Each entry has a mark indicating the beginning of the identification which is "I" (not shown in Figure 4). A "D" pulse is generated when data commences after the identification. If a fixed number of binary digits is used for each identification, a D pulse may be generated each time by counting the identification digits and no recording of this is necessary. Otherwise, another mark may be recorded to generate the D pulse.

*Scanning the disc*

In this embodiment of the invention, scanning is always begun with the scanning beam passing through the outermost track, the one containing the largest numbers. This is not to be considered as a limitation on the invention, since other arrangements can be made employing the principles to be described herein. Let the identification recorded on the disc be designated as *Id* and the identification of the desired data be designated as I*s*. There are then three possibilites which can occur when we look at any word:

$Id>Is$; $Id<Is$; and $Id=Is$

If $Id>Is$, a control signal is generated which pushes the beam to the next track.

If $Id<Is$, the beam remains on the track. If all the words on this track are smaller than *Is*, the beam moves back to the preceding track and scans it for one complete revolution.

If $Id=Is$, the data will be read out and the search will be over. If *Is* is not found, a "not here" signal is generated.

Let us assume, for example, that we are searching for the number 0110 on the disc of Figure 4.

*First case.*—We begin by entering the outermost track at some random point, 1001, for example. The beam will read the most significant digit first and compare it to the most significant digit in the number we are searching for. The most significant digit in the number we first look at is 1; the most significant digit in the number we are searching for is 0. Search control circuitry notes that $Id>Is$ and generates a signal to move the beam to the next track.

On the next track, the first number we look at is 0101. The most significant digit of I*d* equals the most significant digit of I*s*. The third digit of I*d* (0), however, is less than the third digit of I*s* (1). Since $Id<Is$, the beam continues to track the line and arrives next at 0110, the number we are looking for.

*Second case.*—We begin by entering the outermost track at 1100 and move to the next track as in the first case.

We enter the next track at 0111. Since 0111 is larger than our I*s*, 0110, we move to the third track. The beam scans the third track until it reaches the origin mark. Since the largest number on this track (the one before the origin mark) is less than *Is*, the beam returns to the second track. It must complete a revolution on the second track in the course of which I*s* will be found.

Figure 5 is a schematic diagram of the circuitry employed to search a photographic disc 102 used as a permanent store. In the system shown, a cathode-ray tube 100, which may be the flying spot scanner type, provides a light beam. This beam is focused by a lens 101 on a track of the disc. The light beam modulations, caused by rotating the disc having code markings of the type described previously, are focused by a lens 103 on a photoelectric cell 104. Apparatus to control the position of the cathode-ray beam includes a current step generator 112 and an integrating deflection amplifier 109. Inquiries are made of the system using a keyboard 121, the output from which is stored in an input register 122; transfer gates 123 under control of the remainder of the search and control system transfer the next identification for which a search is to be conducted into a shift register 124. The shift register transmits identification digits to be compared with digits read from the disc to a comparison circuit 125. The operation and interconnection of this system will be more clearly understood if an actual search and comparison operation is described. First, consider the condition where, upon a comparison, $Id>Is$ The comparison circuit 125 generates a pulse which goes through AND gate 129 and causes the current step generator 112 to generate a positive signal to deflect the light spot toward the center of the disc 102 or, in other words, in toward the next track. At the same time this pulse goes through the OR gate 128 to change the sense of a tracking servo. This tracking servo circuit will be described later. While the servo is changing sense, a one-shot multivibrator 113 is pulsed to disable the servo input to the integrating amplifier 109 while the beam is switching tracks. Otherwise, the correction voltage to the servo might keep the beam from switching tracks.

At the same time as the comparison circuits 125 generate the $Id>Is$ signal, they also generate an $Id\neq Is$ signal. This signal goes through OR gate circuit 133, sets the shift flip-flop circuit 145 to 0 and thereby closes AND gate 120, preventing clock pulses from reaching the comparison circuit 125 and cutting off further output signals from this circuit. To simplify explanation, flip-flop circuits will be designated as having either a 1 or a 0 condition representing which of their two stable states is presenting an output. Closing AND gate 120 also cuts off shift pulses to shift register 124. An $Id\neq Is$ signal also sets flip-flop 143 to 0, thereby closing AND gate 146 and blocking D pulses.

Now assume upon comparison that $Id<Is$

The comparison circuit 125 sets flip-flop 144 to 1 through the $Id<Is$ output line. AND gate 130 is opened but, since the origin has not yet been reached, there is no T pulse coming through it.

The $Id\neq Is$ output line of the comparator 125 through OR gate 133 sets flip-flop 145 to 0. With flip-flop 145 in its 0 state, AND gate 120 is closed and there will be no further clock pulses entering the comparison circuit. Furthermore, no shift pulse will enter shift register 124. Therefore, the comparison circuit will have no output.

$Id\neq Is$ output will also go through OR gate 131 to set flip-flop 143 to 0. Setting flip-flop 143 to 0 closes AND gate 146. Closing AND gate 146 prevents D pulses from notifying the output that I*s* has been found and from notifying the reading circuit to read the data through flip-flop 141.

The next I pulse from digit detector 117 will go through AND gate 132 to reset flip-flop 143 to 1, 144 to 0 and 145 to 1. With 145 set to 1, AND gate 120 is open again to permit the comparison circuits to examine the next word.

At the same time, the I pulse through AND gate 132 shifts the contents of the input register 122 through the transfer gates 123 to the shift register 124. The contents of the shift register may now be compared to the next word.

The last word on the line to be examined before the origin or T pulse is the largest word on the line. If this word is less than I*s*, it is necessary to shift back a line. An $Id>Is$ output sets flip-flop 144 to 1 opening AND gate 130. The following T pulse sets flip-flop 127 to 1 through AND gate 130.

Delay network 126 delays the signal long enough so that AND gate 114 will not be opened in time to pass the initiating T pulse to the T counter.

After AND gate 130 is opened, the T pulse goes through OR gate 128 to shift the sense of the servo toggle flip-flop 111. Also through OR gate 128, the T pulse trips the one-shot disabling multivibrator 113 to disable the servo while the spot changes tracks.

The T pulse also signals the current step generator 112 to send a signal to the integrating deflection amplifier 109 to push the spot out to the next largest track.

On the new track, the spot searches for I*s* just as it did previously. Assume now that $Id>Is$. The $Id>Is$ signal from the comparison circuit cannot get through AND gate 129 because flip-flop 127 is in its 1 state and is keeping AND gate 129 closed. Hence, an $Id>Is$ signal has no effect. This is only proper, since the device might otherwise simply pass the spot back and forth from one line to the next.

As has been mentioned previously, the circuit is designed to allow at least one complete revolution of the disc after the spot has moved back one track. This is accomplished by counting the T or origin pulses. These pulses go through AND gate 114 to the T counter consisting of flip-flops 134 and 135.

The first T pulse sets flip-flop 134 to 1. The second sets flip-flop 134 back to 0 and sets flip-flop 135 to 1. Setting flip-flop 135 to 1 causes a "not here" signal to go through AND gate 138 to the output. Setting flip-flop 135 to 1 also causes differentiator 136 to send a reset pulse through OR gate 137. The reset pulse sets flip-flop 143 back to 0 through OR gate 131. This closes AND gate 146 so that data will not be read. The reset pulse also sets flip-flop 142 to 0, flip-flop 144 to 0, and flip-flop 145 to 0 through OR gate 133, resets the servo toggle flip-flop to 0, and resets the integrating deflection amplifier so that the cathode-ray tube beam is returned to the outside information track. Setting flip-flop 145 to 0 closes AND gate 120. Closing AND gate 120 prevents further comparison.

Further I pulses will not be noticed. Flip-flop 142 is set to 0 so that AND gate 132 is closed. Therefore, I pulses will not get through to flip-flops 143, 144, or 145 to start and carry on the comparison.

*Id=Is*

A "begin search" pulse from a source 150 sets flip-flop 142 to 1 and flip-flop 127 to 0. With flip-flop 142 set to 1, AND gate 132 is open. The I pulse goes through AND gate 132 and sets flip-flop 143 to 1, flip-flop 144 to 0, and flip-flop 145 to 1. This I pulse also transfers the contents of the input register 122 through the transfer gates 123 to the shift register 124.

The I pulse also sets flip-flop 141 to 1. This closes AND gate 119, preventing digits from being read out.

With flip-flop 145 set to 1, AND gate 120 is open, clock pulses come through AND gate 120, and comparison proceeds.

Since *Id=Is*, there is no output from the comparison circuit and the conditions under which comparison began remain unchanged.

When the D pulse arrives, AND gate 146 is open, since flip-flop 143 is set to 1. The D pulse sets flip-flop 142 to 0, flip-flop 141 to 0, and triggers reset multivibrator 139.

With flip-flop 142 set to 0 and reset multivibrator 139 triggered, AND gate 140 will be open for slightly longer than the duration from D to the next I. This period is the output pulse duration of one-shot multivibrator 139.

Since AND gate 140 will be open for the next I pulse, this pulse will go through it to OR gate 137 to reset the deflection amplifier 109 and flip-flops 143, 144, and 145

But before the next I pulse, the data must be read out to a buffer register 151.

Since flip-flop 141 is set to 0, AND gate 119 has one input energized. Whenever the digit toggle flip-flop 118 stores a 1, AND gate 119 will pass clock pulses from clock generator 115 to the digits-out line.

At the same time, AND gate 116 is open when flip-flop 141 is in its 0 state. AND gate 116 passes every clock pulse to the clock-out line. Therefore, a digits-out pulse and a clock-out pulse together represent a 1. A clock-out pulse alone represents a 0.

After the last digit of the data has been read out, the I pulse for the next word causes the reset pulse to be generated as has been described above.

*Keeping the beam on the track*

Assume that the beam is located on the desired track. Slight irregularities in the disc, vibrations, fluctuations in supply voltage, etc., will tend to throw it off this track. A servo system is used to keep the beam on the track. Essentially what this servo system does is to generate an error voltage in the photomultiplier tube output and use this voltage to return the spot to the track.

If we are on track 1, as seen in Figure 3, and the spot begins to drift out away from the center, more light will get through the disc and the negative D. C. output of the photomultiplier tube 104 will increase. This D. C. will be fed through D. C. amplifier 105, AND gate 110, OR gate 108, integrating deflection amplifier 109 to the deflection plates of the cathode-ray tube 100. The voltage on these plates will cause the spot to move in again toward the center of the disc 102 and back onto track 1. Obviously, for the signal to get through AND gate 110, servo toggle flip-flop 111 will have to be in its 0 state. When the beam is on track 1, the reset pulse will have set servo toggle 111 to 0 through OR gate 137.

Now assume that we have moved to track 2 on Figure 1. This change will be preceded by a pulse through OR gate 128 either from *Id>Is* or from T following *Id<Is* through flip-flop 144. In either case, servo toggle flip-flop 111 will be set to 1 on track 2 and on all even-numbered tracks. (Since we are set to 0 on track 1 and since each track-change pulse reverses servo toggle 111, this toggle will be at 0 on all odd tracks and at 1 on all even tracks.)

As the beam moves outward from track 2, it moves into a completely opaque area of the disc. As a result, the negative D. C. level of the photomultipler tube 104 output falls. The output of D. C. amplifier 105 falls. This change in output is amplified in the sign-reversing amplifier 106. Since servo toggle 111 is in its 1 state, AND gate 107 is open and AND gate 110 is closed. Therefore, the output of the sign-reversing amplifier reaches the integrating deflection amplifier. As the D. C. amplifier 105 output falls, the output of the negative amplifier 106 rises. The result is that the spot moves back in toward track 2.

The same action takes place on all even tracks as has been described for track 2, and the same action on all odd tracks as took place on track 1.

The opposite actions take place if the beam tends to drift in toward the center of the disc. The correction voltages then move it outward.

*Moving from one track to another*

We have already indicated that an *Id>Is* pulse moves the spot one track in toward the center of the disc and a T pulse immediately following an *Id<Is* pulse moves the spot one track away from the center. The *Id>Is* pulse reverses the servo toggle flip-flop 111 through OR gate 128 and causes a positive current pulse to be generated by current step generator 112. This pulse is integrated in integrating amplifier 109 and emerges just large enough to move the spot into the region between the track it has left and the one it is moving toward. Once the spot is in this region, the servo circuit, whose sense has been reversed, will take over and move it to the next track.

The T pulse following an *Id<Is* pulse goes through AND gate 130, reverses the sense of the servo 111 through OR gate 128, and causes the current step generator 112 to generate a negative pulse. This pulse reaches the deflection plates of cathode-ray tube 100 through integrating amplifier 109. It moves the spot away from the center of the disc into the region between the track it has left and the next track out. Then the servo, whose sense has been reversed, moves the spot the rest of the way to this next track.

*Reading the digits*

The tracking circuits we have been describing are fundamentally directed to one purpose: to reach the word we are searching for in the minimum time. Obviously, these circuits would not work at all unless it can be determined whether

*Id=Is, Id>Is,* or *Id<Is*

The sequences of light and dark areas on the disc must be recognized as 0's or 1's and each number read on the disc, *Id*, must be compared with the number punched into the keyboard 121.

Since each digit read consists of two areas, a light followed by a dark or vice versa, some signal is needed to tell when each digit is beginning. Since the speed of the disc can never be absolutely uniform, this signal will have to be keyed to the rotation of the disc.

The most obvious way to accomplish such keying is to put a clock track on the disc and let a second and separate light beam continuously scan this clock track. The resulting pulses could then be used to time the signals read on the information tracks. The trouble with this sysem is that it makes writing on the disc quite complex, since the clock pulses must synchronize the writing circuits so that each digit begins on the same radius as a clock pulse.

A system which complicates the electronics but allows greater tolerances on the placement of the digits, would use the digit signals themselves to generate the clock pulses. In this invention, clock pulse generator 115 performs this function. This generator, broadly speaking, consists essentially of an oscillator synchronized by the signals from photomultiplier 104 and D. C. amplifier 105.

Figure 6:
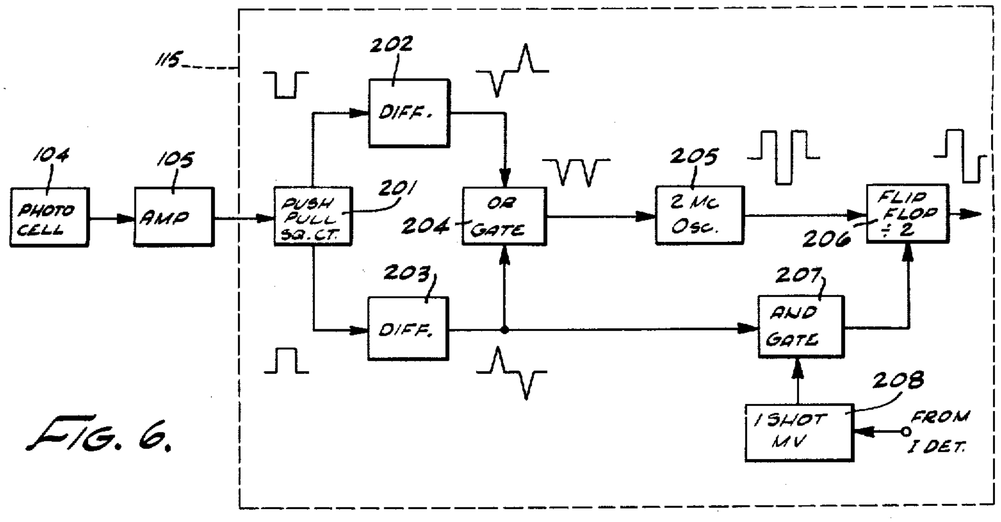
Figure 6 is a schematic diagram of a clock pulse generator employed in this embodiment of the invention.

Figure 6 is a schematic diagram of the clock pulse generator 115.

The output of the photocell 104 is applied to the amplifier 105 which then drives the clock pulse generator 115. The push-pull squaring circuit 201 is really a combination of a wave shaping or wave squaring circuit and a phase inverter. Its outputs consist of two square waves 180° out of phase. Each output is fed to a differentiating circuit 202, 203 which generates a pulse at each discontinuity in its square wave input. At the output of each differentiator, there will be two pulses for each square wave—a positive and a negative pulse. One differentiator output will consist of a positive pulse followed by a negative and the other a negative followed by a positive. The OR gate circuit 204 to which these differentiators are coupled is simply a rectifier which passes only the negative pulses.

Negative pulses are generated at each square wave discontinuity and these negative pulses are used to synchronize a 2-megacycle oscillator 205. The output of this oscillator is then halved by flip-flop 206 and emerges as a series of pulses at a frequency of one megacycle.

If these pulses are to perform their function, they must come at the middle of each digit and not half a cycle later. If they come out of phase, the digits will not be read properly.

In order to insure that the clock pulses occur in the proper phase, the frequency dividing flip-flop 206 is reset to zero at the beginning of each word just before the reception of the initial digit. Therefore, it will always generate its first pulse on the second count of the 2-megacycle oscillator 205. The frequency dividing flip-flop is set to zero by the circuit containing the differentiator 203, AND gate 207, the one-shot multivibrator 208, and the line from the I detector.

The I signal for the start of a word consists of a long 1. This 1 is the length of 3 normal digits. The output of the photomultiplier tube when reading it is three half-digit spaces up and three down.

An integrating circuit in the digit detector 117 of Figure 5 is used to detect a change in the D. C. level when the first long half of the I signal occurs.

This rise in D. C. level triggers the one-shot multivibrator 208 in Figure 6. The one-shot multivibrator opens AND gate 207 for one digit time.

Meanwhile, the I signal from the photomultiplier tube has also been fed to push-pull squaring circuit 201, and the negative charge in the middle of it emerges from differentiator 203 as a positive pulse. This positive pulse goes through the open AND gate 207 and sets the frequency halving flip-flop to 0.

Between this time and the start of the initial digit, there is a digit time and a half (a microsecond and a half). The next output clock pulse of frequency divider 206 will occur half a digit time before the start of the first digit. The following clock pulse will occur half a digit time after the start of the first digit.

Figure 7:
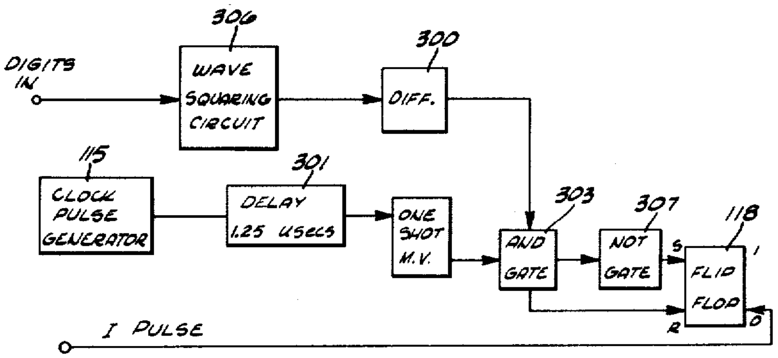
Figure 7 is a schematic diagram of a digit detector employed in this embodiment of the invention.

Figure 7 is a schematic diagram of the digit detector circuit 117. The clock pulse from generator 115 is delayed by a network 301 1.25 microsectonds so that it enters a one-shot multivibrator 302 in the middle of the first half of each digit. One-shot multivibrator 302 opens AND gate 303 for .5 microseconds. While AND gate 303 is open, the up-down or the down-up excursion in the middle of each digit takes place. The digit is shaped to be a square wave in squaring circuit 306 and the excursions are differentiated in differentiator 300. Because squaring circuit 306 is an inverter, a 0 will provide a negative output pulse and a 1 will provide a positive output pulse. A positive pulse will go through AND gate 303, be inverted in NOT circuit 307, and set digit toggle 118 to 1. A negative pulse will set digit toggle 118 to 0, through AND gate 303. An I pulse always sets digit toggle 118 to 0 at the beginning of a word.

*Comparing Id with Is*

The identification number being searched for, I*s*, as described in connection with Figure 5, is typed or otherwise entered on keyboard 121 and set into input register 122. From here it is transferred through transfer gates 123 by an I pulse at the beginning of each word. This I pulse reaches the transfer gates through AND gate 132 which is opened by setting flip-flop 142 to 1. Flip-flop 142 is set to 1 by the begin-search signal.

The transfer gates 123 transfer I*s* to the shift register 124 at the beginning of each word. The clock pulses then shift the digits in the shifting register serially into the comparison circuit 125 where each digit, in turn, is compared with the digits in the digit toggle 118.

The first digit will be presented to the digit toggle 118 sometime in the one-half microsecond following the third clock pulse after the I pulse. At this time, the digits in the shift register 124 should still be in the same positions they were in when the I pulse originally transferred them in. Therefore, there must be a delay of $$2\pm{}^{.5}_{0}$$

microseconds so that no shifts or comparisons can occur until the third clock pulse is over. This can be accomplished by delaying the signal which turns on the shift flip-flop 145.

The reason for the 2-microsecond delay can be seen from an analysis of the time table of events. The I pulse triggers a one-microsecond one-shot multi-vibrator 208. This triggering action must take place in the half microsecond before the positive-negative excursion of the I signal. If it took place sooner a 0–1 sequence could produce an I pulse. If it took place later, the gate 207 would not open soon enough to pass the differentiated reset pulse for flip-flop 206, because this reset pulse is generated from the positive-negative excursion itself.

When flip-flop 206 is set to zero, an output pulse is generated. This is the first clock pulse after I. As stated above, it must occur within .5 microseconds of I.

The next clock pulse occurs 1 microsecond later. There is still no digit being read as the second half or down position of the I signal is still occurring.

The third clock pulse occurs after $$2\pm{}^{.5}_{0}$$

microseconds. It occurs after .5 microseconds of the first digit and initiates the sampling of the second half of this digit. The result of this sampling is set into digit toggle flip-flop 118. Obviously it is not desired that any of these three pulses transfer digits in the shift register, so the shifting and comparison must be delayed until they are over.

With the first digit read positioned in the digit toggle 118 and the first digit to be compared positioned in the output stage of the shift register 124, the comparison circuit 125 compares the digits. The most significant digits are read and compared first.

Figure 8:
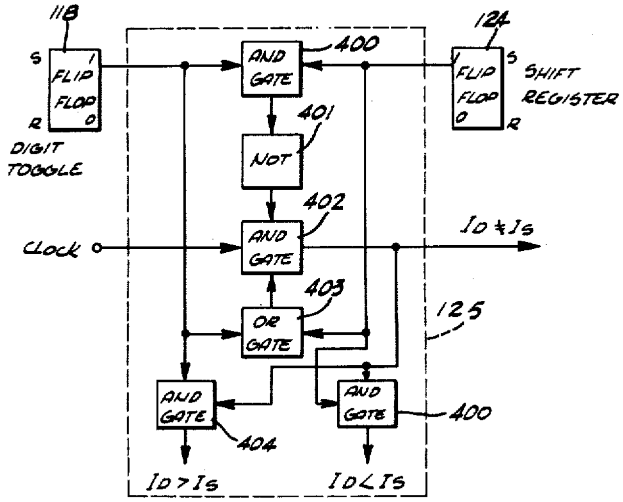
Figure 8 is a schematic diagram of the comparison circuit 125.

Reference is now made to Figure 8 which shows a schematic diagram of the comparator circuit 125.

If *Id>Is*, digit toggle 118 will store a 1 when the comparing position of shift register 124 stores a 0. Under these conditions, AND gate 400 will be closed by shift register 124. Therefore, NOT circuit 401 (an inverter) will enable its input to AND gate 402. Meanwhile, digit toggle 118 through OR gate 403 will enable its input to AND gate 402. The clock pulse will then go through AND gate 402 to form the *Id≠Is* pulse.

*Id≠Is* will go through AND gate 404 to form the *Id>Is* pulse.

If *Id<Is*, digit toggle 118 will store a 0 when shift register 124 stores a 1. AND gate 400 will be closed and AND gate 402 opens through NOT circuit 401, and through OR gate 403. The clock pulse will go through AND gate 402 to form the *Id≠Is* pulse. The *Id≠Is* pulse will go through AND gate 405, which is open when shift register 124 is in its 1 state, to form the *Id<Is* pulse.

If *Id*=1 and *Is*=1, AND gate 400 will be open and AND gate 402 will be closed. Therefore, there will be no *Id≠Is* pulse. If there is no *Id≠Is* pulse, there will be no *Id>Is* and no *Id<Is* pulse.

If *Id*=0 and *Is*=0, AND gate 400 will be closed, but AND gate 402 will also be closed through OR gate 403. Therefore, there will be no *Id≠Is* pulse and no *Id<Is* pulse and no *Id>Is* pulse.

The device will go on to compare the next most significant digit in precisely this same way.

*The digit detector generating the T pulse*

Figure 9:
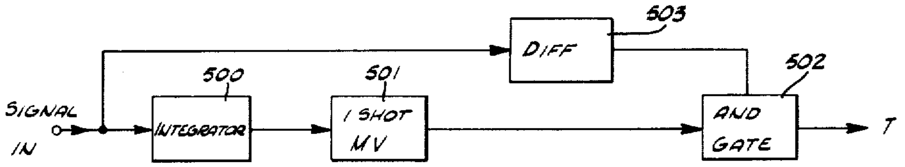
Figure 9 is a schematic diagram of an origin pulse detector employed in the embodiment of the invention.

The origin sign is a long pulse 1.5 microseconds down followed by 1.5 microseconds up. Figure 9 is a schematic diagram of the T detection circuit which is included within the digit detector rectangle 117 in Figure 5. Integrator 500 produces a negative output during the 1.5 microseconds down period. This triggers one-shot multivibrator 501 which opens AND gate 502 for one microsecond. While AND gate 502 is open, the origin or T sign makes its down-up excursion. This is differentiated in differentiating network 503 and the resulting positive pulse goes through AND gate 502 and emerges as the T pulse.

*The digit detector generating the D pulse*

A D pulse denotes the beginning of the data. In this embodiment, there is no recorded D punctuation on the track, although recording such a mark is feasible. Instead, a binary counter counts the digits in the identification and generates the D pulse after the last of these digits. This counter has $\text{Log}_2\text{N}$ stages where N is the number of digits in the identification. Each stage of the counter is a flip-flop and the differentiated 1→0 excursion of the last stage constitutes the D pulse. This pulse sets the counter stages to 0. The *Id≠Is* pulse also sets the counter to 0.

*The magnetic store*

The magnetic and photographic stores are searched simultaneously. The logic of both stores is the same and in searching similar logical circuits may be used with the exception of the clock-pulse generator and the I, D, and T pulse-detection circuits. Since a magnetic drum can have control tracks, clock, I, D, and T pulses can be placed on special tracks and need merely be read from them. Also, the spot positioning circuits of the photographic-store reader are replaced by reading head selection circuits. Picking a track is simply a matter of completing the circuit from any one of the reading heads to an amplifier and digit detector.

0 can be a positively magnetized length of track and 1 a negatively magnetized length. The output of the reading head will consist of a negative pulse whenever the head passes from a 0 to a 1 and a positive pulse whenever the head passes from a 1 to a 0.

Figure 10:
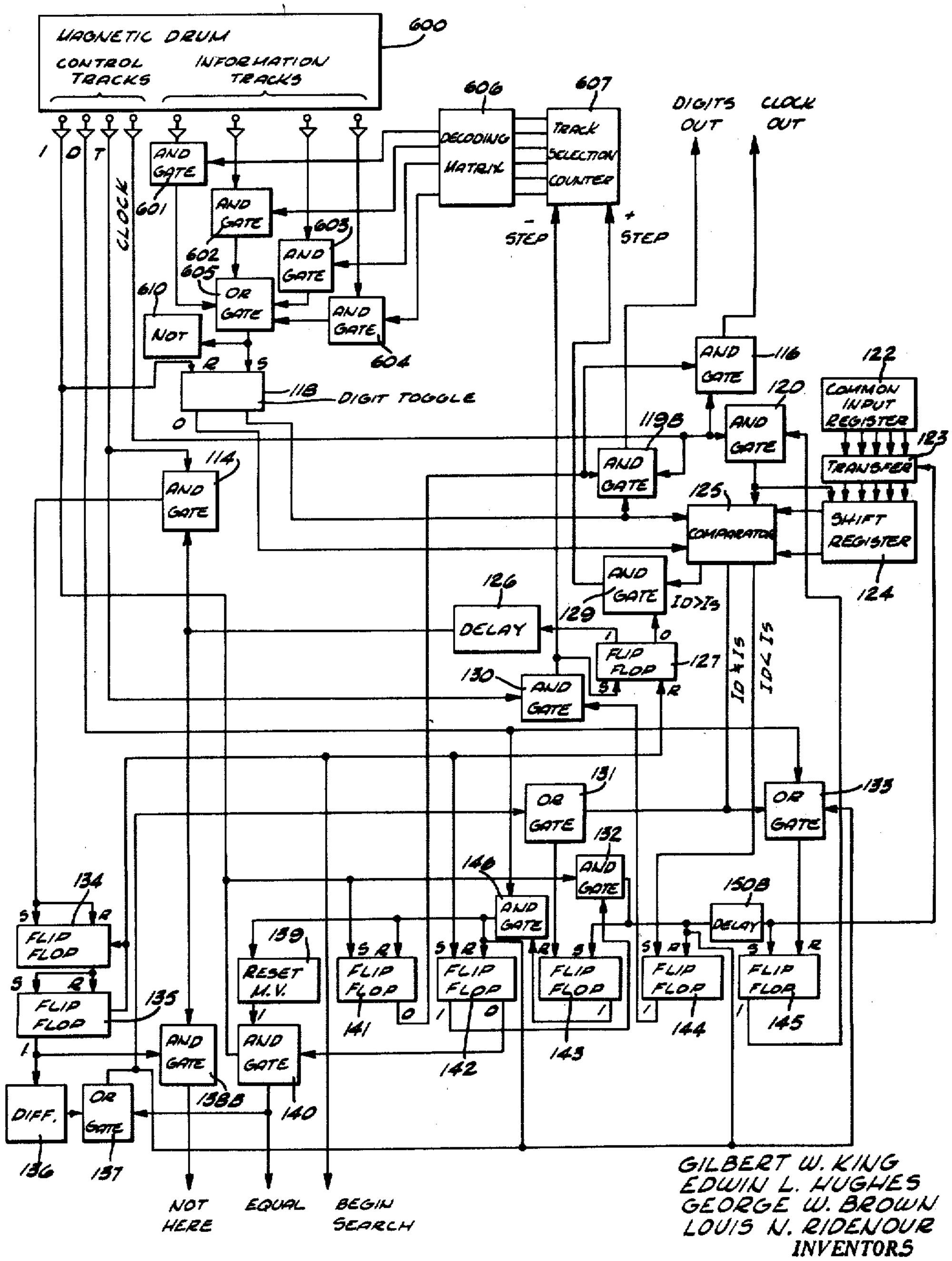
Figure 10 is a schematic diagram of the search and control apparatus employed with the erasable store employed in the embodiment of the invention.

Figure 10 is a schematic diagram of the magnetic store search system for the telephone book. Those parts of the diagram which are identical with Figure 5, the diagram of the photographic store, have been given the same numbers as they have on Figure 5. The logic of these parts of the system has already been explained, and in the following description unnecessary repetition of this explanation is omitted.

*Searching the drum*

Information is arranged on the drum in the same order as on the disc. The largest identification numbers are placed on the first track and each succeeding track contains smaller numbers. The drum is rotated so that as any one track is scanned the numbers pass the reading head in order of increasing magnitude, until the origin is reached. The most significant digit of each number will be read first.

If *Id>Is*, the comparison circuit 125 will generate a pulse which will go through AND gate 129 to the step + input of the track selection counter 607. This counter will count 1 and will signal the decoding matrix 606 to close the AND gate from the head now reading and open the AND gate from the next head. For example, AND gate 604 might be closed and AND gate 603 opened. In either case, the signals go through OR gate 605 to the digit toggle flip-flop 118.

In addition, an *Id≠Is* pulse will be generated and the actions associated with this pulse will take place.

If the comparator generates an *Id<Is* pulse, it serves to set flip-flop 144 to 1. If this pulse occurs immediately before a T pulse, the T pulse will go through AND gate 130 and a step pulse will appear at the input to the track selection counter. A pulse at this input will cause the track selection counter 607 to count backwards one count. This will cause the decoding matrix 606 to reopen the AND gate to the previous head.

At the same time, flip-flop 127 will be set to 1 and the circuits which assure a complete search of the track to which return has been made will operate.

The logic for *Id=Is* is exactly the same as for the disc. There is no output from the comparison circuit 125. When the D pulse arrives, AND gate 146 is open, since flip-flop 143 is set to 1. The D pulse sets flip-flop 142 to 0, flip-flop 141 to 0, and triggers reset multivibrator 139. AND gates 119 and 116 are enabled and digits and clock pulses are read out to an output register.

Figure 11:
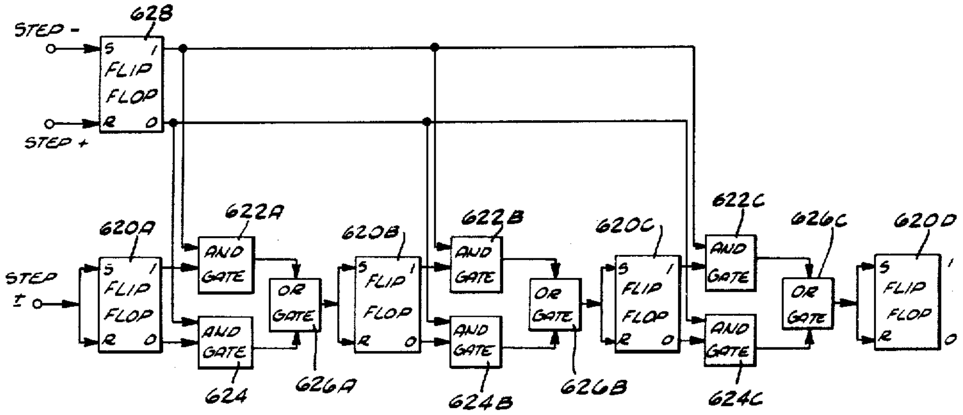
Figure 11 is a schematic diagram of a track selection counter employed in the erasable store portion of the embodiment of the invention.

Figure 11 is a schematic diagram of the track selection counter 607. It consists of a reversible binary counter, i. e., one which can count either forwards or backwards. There are provided the required number of flip-flop stages 620. Each stage has a 1 and a 0 output. AND gates 622, 624 are provided to respectively couple the 1 and the 0 output to an OR gate 626. Second required inputs to AND gates 622, 624 are respectively provided from the 1 and 0 outputs of a step control flip-flop. The OR gates 626 are conected to drive the succeeding flip-flops with their outputs. The direction of count is controlled by the condition of flip-flop 628, since this determines which of the AND gates 622, 624 are open to drive the succeeding flip-flops in response to input stepping pulses.

Figure 12:
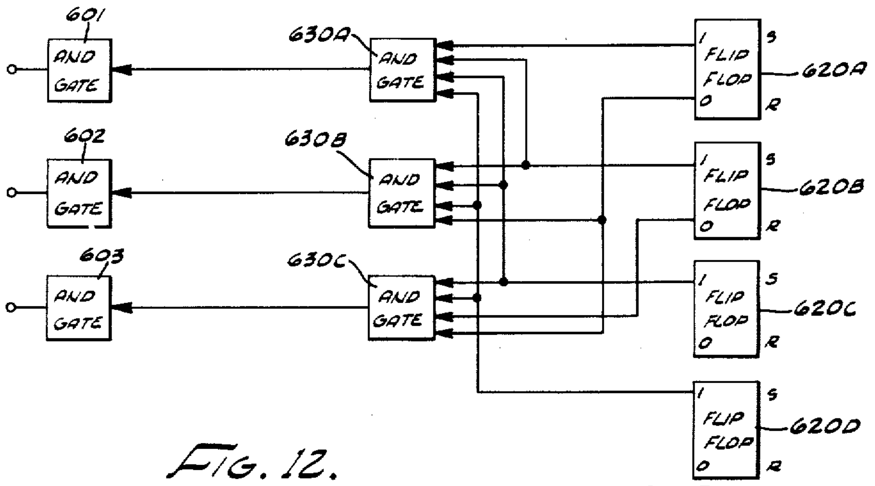
Figure 12 is a schematic diagram of a decoding matrix employed in the erasable store portion of the embodiment of the invention.

Figure 12 shows schematically a suitable decoding matrix. It consists of a series of AND gates 630 which are connected to the counter stages 620 in a desired manner so that, for any given count providing a certain voltage pattern of flip-flop outputs, only one of the gates 630 is opened. This primes only one of the gates 601, 602, 603 to be responsive to pass output from the reading head to which it is coupled.

*Digit detection*

The I pulse sets digit toggle 118 to 0. If the first digit is a 1, the change from no magnetization to positive magnetization will produce a negative pulse which will shift digit toggle flip-flop 118 to 1 through OR gate 605. If the next digit is a 1, there will be no output from the reading head so digit toggle 118 will remain in the 1 state. A 0 following a 1 will cause a positive pulse which will be inverted in NOT circuits 610 and will set digit toggle 118 to 0.

There has been shown and described heretofore an embodiment of the invention wherein a permanent and an erasable store are cooperatively combined to provide accurate information. A unique system and method for searching is also described. The embodiment of the invention described has been called a telephone book. The system may be utilized in other forms which are still within the spirit and scope of the present invention. The photographic disc, for example, may be a photographic drum. Ferrite cores may, for example, be employed to form the erasable memory. The presently known core memory systems employ cores having toroidal shape and substantially rectangular hysteresis characteristics. One type is described in an article by Rajchman in October 1953 Proceedings of the Institute of Radio Engineers and is called "A Myriabit Magnetic-Core Matrix Memory," and another type is described in an article by Forrester entitled, "Digital Information Storage in Three Dimensions Using Magnetic Cores," Journal of Applied Physics, pages 44–48, January 1951. In either case the information is stored as the magnetic condition of the cores. The cores are arranged in columns and rows. If a column of cores is held analagous to a track, it should be apparent how a search can rapidly proceed through a memory employing the principles described herein. No origin sign is required but an equivalent signal may be generated when a search has come to the end of a column.

Figure 13:
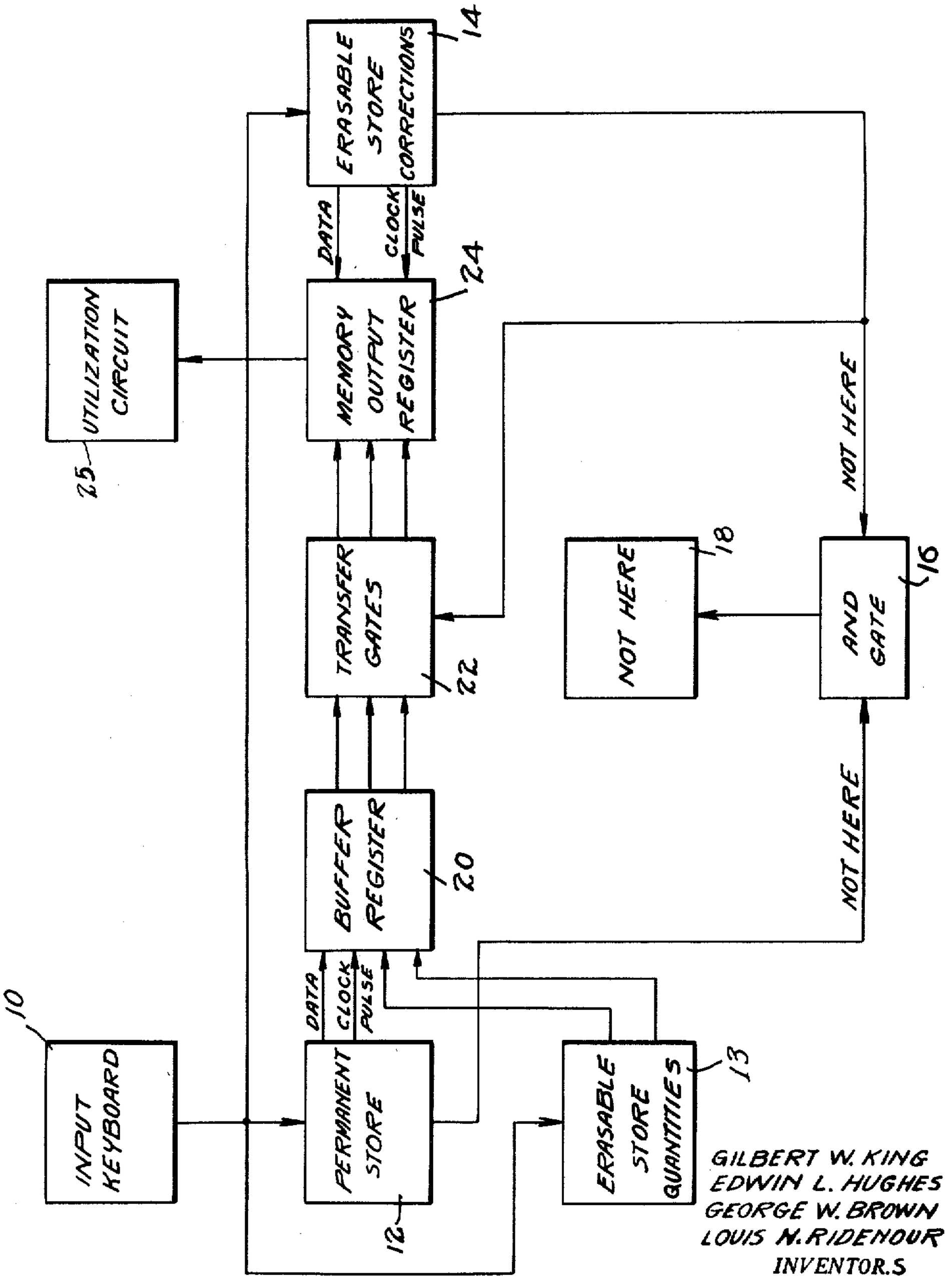
Figure 13 is a block diagram of the embodiment of the invention employing an additional erasable store.

The combined permanent and erasable store may be utilized as an inventory machine. The stock descriptions are recorded in the permanent store since they change infrequently. The quantities of stock on hand may be recorded on the erasable store since this is information which continually changes. Both stores provide supplementary information here. The operation is as has been previously described herein for the telephone book. If the stock descriptions change frequently, then an inventory machine can be constructed using two magnetic stores. An arrangement for accomplishing such an operation is found in block diagram form in Figure 13. The similarity between Figure 13 and Figure 1 should be recognized here. Similar functioning apparatus is accordingly provided with the same reference numbers as shown in Figure 1. Actually, the additional, or second, erasable store 13 functions substantially as the first erasable store 14, being searched in the same manner. The only difference is that the second erasable store 13 applies its output to additional stages of the buffer register 20, to indicate quantities of the item which are also read out from the permanent store 12 into the buffer register. Both erasable stores, if magnetic drums are used, may be mounted and driven by the same shaft, or, preferably, these may be two separate sections of one large magnetic drum. The first erasable store 14 is combined with the permanent store and operates in the same fashion as in the telephone book—namely, to provide for corrections and changes in the permanent store. The second erasable store is used to provide information as to the quantities of stock on hand. It may do so by having the desired data identified and searched for in the manner previously described or the output from the permanent store may provide an address for the data desired. In any event, where information requires storing and such information can be divided into two parts on the basis of permanence, the permanent part may be stored in the permanent store and the temporary part in the erasable store where it may be searched out either in the manner described herein or using address information provided from the permanent store data. The order of search is immaterial. The erasable magnetic stores may be searched first and then a determination may be made to search the photographic store.

The details of the above apparatus are shown and described previously in the remainder of the application, and it is not believed necessary, in view of this, to repeat these details. The addition of the erasable store 13 merely requires for readout the duplication of the equipment employed for readout of the erasable store 14.

It should be clear, however, that the logical association of a necessarily smaller magnetic storage system with a very large photographic store removes much of the limitation that is occasioned by the difficulty of writing and erasure in photographic media. The information obtained from both storage media can be resolved either by elimination of the information received from one in favor of the information received from the other, the supplementation of the information received from one with the information received from the other, the cancellation of both when both appear, or by any other desired logical process.

The basic circuit components such as flip-flops, multivibrators, inverters or NOT circuits, AND and OR gates, as well as amplifiers and integrators, are all well-known and practically standard in the art and are found thoroughly described in many published articles and in any text on computers such as "High Speed Computing Devices" previously referred to.

Accordingly, there has been described hereinabove a novel and useful combination of a photographic store and a magnetic store wherein the latter supplements the fallibility of the former, thus providing a memory system having high storage capacity, economy and changeability. Also, a unique method and apparatus for searching has been described which permits the location of data within two revolutions of a cyclic store.

We claim:

1. An information storage system comprising the combination of a nonerasable information storage device and an erasable information storage device, means to search said nonerasable storage device for desired information, means to search said erasable storage device for information related to said desired information, means to resolve the information derived from both information storage devices from said searches, a common output device, and means to enter said resolved information into said common output device.

2. An information storage system comprising the combination of a cyclic nonerasable information storage device and a cyclic erasable information storage device, means to search said cyclic nonerasable storage device for desired information, means to search said cyclic erasable storage device for information related to said desired information, means to read out of both storage devices any desired and related information found as a result of said searches, and means to resolve the information read from both said information storage devices.

3. An information storage system comprising the combination of a photographic information storage device and a magnetic information storage device, means to establish the identity of desired information, means to search said photographic storage device for similarly identified information, means to search said magnetic storage device for similarly identified information, means to read out of both storage devices any similarly identified information, means to resolve the information read out of both of said storage devices, and means to read out said resolved information.

4. An information storage system comprising the combination of a nonerasable information storage device, an erasable information storage device having information stored thereon related to the information stored on said nonerasable information storage device, means to establish the identity of desired information, means to search both said storage devices for information identified similarly as said desired information, means to read out of both said storage devices any similarly identified information, and means to modify one with the other the information read out of both said storage devices.

5. An information storage system comprising the combination of a photographic information storage device having items of information stored therein, a magnetic information storage device having items of information stored therein related to those stored in said photographic storage device, means to establish the identity of desired information, means to derive from both said storage devices any information identified similarly to said desired information, and means to resolve the information derived from both said storage devices.

6. An information storage system comprising the combination of a relatively high storage capacity nonerasable information storage device having items of information stored therein and a relatively low storage capacity erasable information storage device having items of information stored therein modifying those items stored in said nonerasable storage device, means to search said nonerasable storage device for a desired item of information, means to search said erasable storage device for modifying items of information, and output means to which both said means to search are coupled to modify the desired information from said nonerasable storage device with said modifying information from said erasable storage device.

7. An information storage system comprising the combination of a photographic information storage device having items of information stored therein in tracks, the items being numerically identified, said identification being recorded in each track in a descending sequence, each track bearing numerically larger identification than a preceding adjacent track, an origin mark recorded on each track between the lowest and highest identification numbers on said track, means including a light beam to read said identification numbers, means responsive to the identification number read being lower than a desired identification number to move said light beam to a succeeding adjacent track, means responsive to the identification number read being larger than said desired identification number to hold said beam on said track for reading the next lower identification, means responsive to reading an origin sign on said track to move said light beam to a preceding adjacent track, means responsive to a read identification number being equal to said desired identification number to read out the information identified thereby; and a magnetic information storage device having information stored therein related to some of the information stored on said photographic disc, means to search said magnetic device for information related to said read-out information, and means to modify said read-out information with said related information from said magnetic store.

8. An information storage system comprising the combination of a photographic information storage device having items of information stored therein in tracks, the items being numerically identified, said identification being recorded in each track in a descending sequence, each track bearing numerically larger identification than a preceding adjacent track, an origin mark recorded on each track between the lowest and highest identification numbers on said track, means including a light beam to read said identification numbers, means responsive to the identification number read being lower than a desired identification number to move said light beam to a succeeding adjacent track, means responsive to the identification number read being larger than said desired identification number to hold said beam on said track for reading the next lower identification, means responsive to reading an origin sign on said track to move said light beam to a preceding adjacent track and to provide a step-back signal, means responsive to a read identification number being equal to said desired identification number to read out the information identified thereby; and means responsive to a reading of two origin signs and said step-back signal to provide a signal indicative that said desired items are not stored therein.

9. An information storage system as recited in claim 8 wherein said means to read said identification numbers includes means to prevent said light beam from being deflected from a track except under the control of each of said means responsive to said read identification number.

10. An information storage system comprising the combination of a photographic information storage device having items of information stored therein in tracks, the items being numerically identified, said identification being recorded in each track in a descending sequence, each track bearing numerically larger identification than a preceding adjacent track, an origin mark recorded on each track between the lowest and highest identification numbers on said track, means including a light beam to read said identification numbers, means responsive to the identification number read being lower than a desired identification number to move said light beam to a succeeding adjacent track, means responsive to the identification number read being larger than said desired identification number to hold said beam on said track for reading the next lower identification, means responsive to reading an origin sign on said track to move said light beam to a preceding adjacent track, means responsive to a read identification number being equal to said desired identification number to read out the information identified thereby; and a magnetic information storage device having information stored therein related to some of the information stored on said photographic storage device, said information being stored thereon in adjacent tracks, the information being numerically identified, said identification being recorded in each track in a descending sequence, each track bearing numerically larger identification than a preceding adjacent track, an origin mark recorded on each track between the lowest and highest identification number on said track, means to read said identification numbers on said track including a magnetic reading head positioned over each track and reading head selecting means to establish from which head a reading is being taken, means responsive to the identification number read being lower than said desired identification number to actuate said selecting means to establish reading from a reading head over a succeeding adjacent track, means responsive to the identification number read being larger than said desired identification number to actuate said selecting means to maintain reading from the head over said track, means responsive to an origin sign being read on said track to actuate said selecting means to establish reading from a preceding track, means responsive to said read identification number being equal to said desired identification number to read out the information identified thereby, and means responsive to the information read out from both said photographic disc device and said magnetic device to modify one with the other.

11. An information storage system comprising a photographic information storage device having items of information stored therein in concentric rings, said information being stored digitally as a series of light transmitting and light absorbing areas in said rings, each ring consisting of two tracks separated by a light absorbing ring and each ring being separated from the other by a light transmitting ring, means including a light beam to read the information stored on each of said tracks, and means to maintain said light beam on a track being read including means responsive to said light beam drifting onto said light trransmitting ring or onto said light absorbing ring to return said light beam to said track.

12. An information storage system comprising the combination of a photographic information storage device and a first and a second magnetic information storage device bearing information related to that stored on said photographic storage device, means to read information stored on said photographic storage device, means to read information from said first magnetic storage device, means to modify the information from said photographic storage device with the information from said first magnetic storage device, means to read information from said second storage device responsive to said information read from said photographic storage device, and means to supplement said modified information from said photographic storage device with said information from said second magnetic storage device.

13. In a memory storage system of the type wherein items of information bear numerical identifications and there are means to store said items in a plurality of adjacent storage tracks, the items being stored in each of said adjacent tracks in a descending identification sequence, each track bearing larger identifications than a preceding adjacent track, means for each track to provide an origin signal at the lowest identification end of said track, means for searching said storage system for data bearing a desired identification comprising means to selectively read from each track, means responsive to an identification read being lower than said desired identification to actuate said means to selectively read to select for reading a succeeding track bearing larger identifications, means responsive to an identification read being larger than said desired identification to actuate said means to selectively read to continue to read the next lower identification from said track, means responsive to an origin signal being read from said track to actuate said means to selectively read to select for reading a preceding track bearing smaller identifications, and means responsive to a read identification number being equal to said desired identification number to read out the information identified thereby.

14. In a memory storage system as recited in claim 13 wherein there are included means responsive to two origin signals being read and to actuation of said means to select for reading a preceding track bearing smaller identifications to provide an output signal indicative that said desired items are not stored therein.

15. In a memory storage system of the type wherein items of information bear numerical identifications and there are means to store said items in a plurality of adjacent storage tracks, the items being stored in each of said adjacent tracks in a descending identification sequence, each track bearing larger identifications than a preceding adjacent track, means for each track to provide an origin signal at the lowest identification end of said track, means for searching said storage system for data bearing a desired identification comprising means to selectively read from each track, means responsive to an identification read being different in one direction than said desired identification to actuate said means to selectively read to select for reading a succeeding track, means responsive to an identification read being different in the opposite direction than said desired identification to actuate said means to selectively read to continue to read from said track, means responsive to an origin signal being read from said track to actuate said means to selectively read to select for reading a preceding track, means responsive to a read identification number being equal to said desired identification number to read out the information identified thereby, and means responsive to two origin signals being read and actuation of said selective reading means to read a preceding track to provide an output signal indicative that said desired items are not stored therein.

References Cited in the file of this patent

UNITED STATES PATENTS

| | | |
|---|---|---|
| 2,474,438 | Schmidt | June 28, 1949 |
| 2,533,242 | Gridley | Dec. 12, 1950 |
| 2,549,071 | Dusek | Apr. 17, 1951 |
| 2,580,768 | Hamilton | Jan. 1, 1952 |
| 2,659,072 | Coales | Nov. 10, 1953 |
| 2,702,380 | Brustman | Feb. 15, 1955 |